United States Patent [19]

Moriyama

[11] Patent Number: 4,824,448

[45] Date of Patent: Apr. 25, 1989

[54] GAS EXPELLING EQUIPMENT FOR USE IN A VISCOUS-MATERIAL KNEADER

[76] Inventor: Masao Moriyama, No. 508-13, Tendocho 17, Nishinomiya, Hyogo 663, Japan

[21] Appl. No.: 219,050

[22] Filed: Jul. 14, 1988

[30] Foreign Application Priority Data

Jul. 15, 1987 [JP] Japan .................................. 62-178061

[51] Int. Cl.⁴ .............................................. B01D 19/00
[52] U.S. Cl. ........................................ 55/190; 55/203; 425/203
[58] Field of Search .................... 425/203; 55/203, 190

[56] References Cited

U.S. PATENT DOCUMENTS 4,117,548 9/1978 Craig ..................................... 425/203

FOREIGN PATENT DOCUMENTS 16500 9/1912 Denmark ............................... 55/203

Primary Examiner—Bernard Nozick
Attorney, Agent, or Firm—Koda and Androlia

[57] ABSTRACT

A device for expelling the gas liberated within a viscous-material treating apparatus such as a kneader, an extruder or the like. The device basically consists of a cone-shaped rotor and a cone-shaped cover member covering the rotor. The cone-shaped rotor is provided with volute protrusions on its coned surface, while the cone-shaped cover member is provided with a gas exhaust orifice to which a vacuum system is to be connected. With the cone-shaped rotor kept rotating, the volute protrusions act so as to prevent the viscous material from being swallowed up together with the liberated gas to be pumped out.

3 Claims, 2 Drawing Sheets

FIG. 3
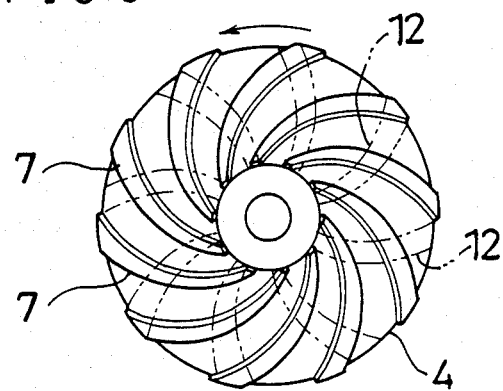
FIG. 4(A)
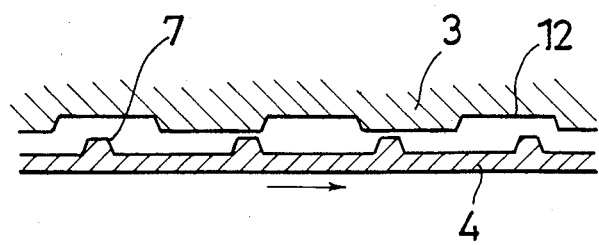
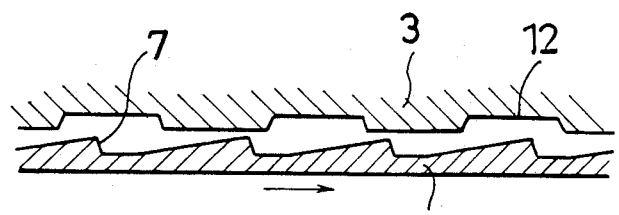
FIG. 4(B)

GAS EXPELLING EQUIPMENT FOR USE IN A VISCOUS-MATERIAL KNEADER

BACKGROUND OF THE INVENTION

The present invention relates to a gas expelling equipment for use in a viscous-material treating apparatus such as a kneader, extruder or the like.

In such an apparatus as an extruder of molten plastic to be molded as a plastic mold product, it is inevitably necessary to expell from the material the gas included in or generated from the same to keep the product free from vacuoles. For example, in a conventional rotary screw type extruder with this problem taken into consideration, the screw is designed to have the pitch made unequally spaced with the coarsely spaced portion localized at the practically central portion of the whole length of the screw, while the barrel or cylinder incasing the screw is provided with a gas exhaust pipe (leading to a exhaust pumping system) at the position corresponding to the above coarsely pitched portion of the screw. With the extruder thus constituted, an external pumping system can exhaust only the gas liberated into a broadened space formed at the coarsely pitched portion of the screw without swallowing up the viscous material being transferred toward the outlet of the extruder. However, an extruder of this type has a decisive disadvantage that the extruder is made uncessarily long. In another type of extruder, instead of providing the extruder screw with a coarsely pitched portion to form there a gas stagnating space, there is equipped, near the gas exhaust pipe, a viscous material restoring device to prevent the viscous material being swallowed up through the gas exhaust pipe. The device is, for example, made up of a pair of screws roughly engaged with each other, and mouted on the extruder barrel or cylinder with the screw axes kept vertical to the axis of the extruder screw. The rotation of the paired screws pushes back the viscous material having a tendency to be drawn out by an external gas exhaust sytem through the gas exhaust pipe. In the case of this extruder it is a disadvantage that the viscous-material restoring device, which is relatively tall, protrudes vertically from the extruder body. Another disadvantage is the device has a complex constitution.

OBJECTS AND SUMMARY OF THE INVENTION

An object of the present invention is to provide an improved gas expelling device being applicable to a viscousmaterial treating apparatus such as a viscous material kneader, extruder or the like with the above-mentioned disadvantages eliminated substantially.

Another object of the present invention is to make up such an improved device as simply as possible.

To achieve the above objects, the gas expelling device according to the present invention fundamentally consists of a a relatively low stature cone-shaped rotor having swirl-shaped protrusions on the cone-surface and a cone-shaped cover member provided with a gas exhaust orifice. With the cone-shaped rotor covered by the cone-shaped cover member, the entire device is mounted on the outer barrel, for example, of an extruder so as to make the axis of the cone-shaped rotor kept vertical to the axis of the extruder screw.

By applying the gas expelling device to a viscous-material treating apparatus such as an extruder, kneader or the like, the apparatus is made compact as a whole, because it can be avoided, when appllied to a screw type extruder, that the screw is made long by being provided with a coarsely pitched portion, and because the gas expelling device itself is short of stature.

BRIEF DESCRIPTION OF THE DRAWING

The present invention is described in further detail in the following on reference of the accompanying drawings, in which:

FIG. 3 illustrates, in another embodiment of the present invention, the relationship between a protrusion pattern provided on the upper surface of the cone-shaped rotor and that provided on the inner surface of the cone-shaped cover member; and FIGS. 4(A) and (B) schematically show the unfolded crosssections illustrating the cross-sectional protrusion patterns of the cone-shaped rotor and of the cone-shaped cover member.

DETAILED DESCRIPTION OF THE INVENTION

Figure 1:
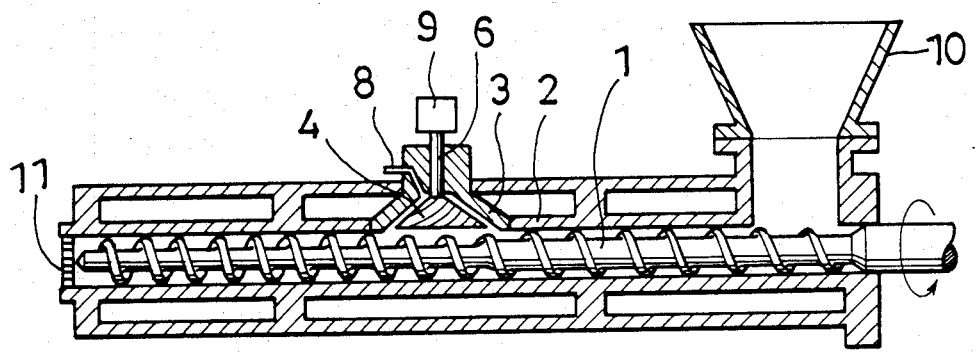
FIG. 1 shows a cross-sectional view of a screw type extruder to which an embodiment of the present invention is applied.

Referring to FIG. 1, which shows the application of an embodiment of the present invention to a screw type extruder, the embodiment consists basically of a cone-shaped cover member 3 and a cone-shaped rotor 4. The cover member 3 is provided with a gas exhaust orifice 8, and the rotor 4 having a connection with a motor 9 through a shaft 6 is made rotatable by that motor 9. On the othe hand the extruder to which the present invention is applied comprises a material hopper 10, a barrel or cylinder 2, a material mixing and transferring screw 1 and an arrangement of extruding nozzles 11.

Figure 2:
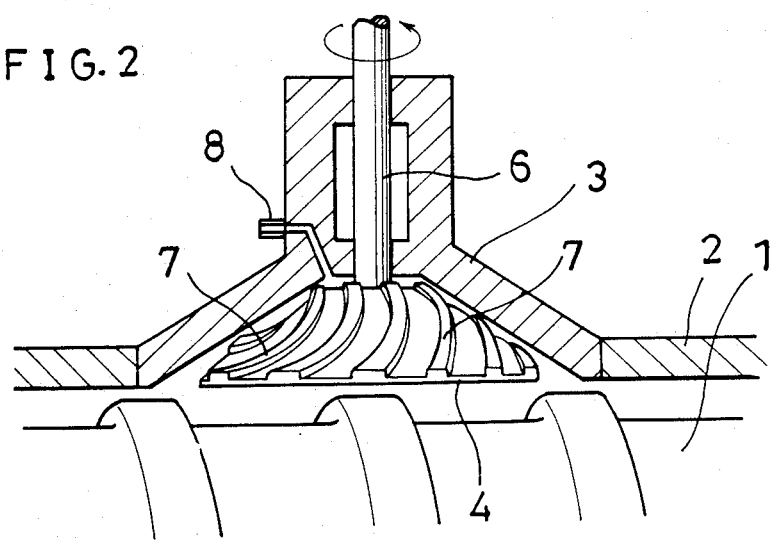
FIG. 2 shows a close-up of the above embodiment of the present invention.

Further referring to FIG. 2 which shows a close-up of the above embodiment, the cone-shaped rotor 4 is provided with a plurality of volute (swirl-shaped) protrusions 7 on its upper surface. With the rotor 4 kept rotating, the volute protrusions 7 act so as to push back and prevent the viscous material from being swallowed up, and thus only the gas liberated within the extruder can be removed by being pumped out through the gas exhaust orifice 8 to which a vacuum system (not shown) is to be connected. Incidentally, it is preferrable that the vertical angle of the geometrical imaginary cone made by an averaged form of the coneshaped rotor 4 is obtuse reaching about 110°.

The present invention can be embodied by providing volute protrusions also on the inner surface of the cone-shaped cover member 3, as is illustrated with dotted lines in FIG. 3. These volute protrusions 12 curves inversely to the volute protrusions 7 provided on the upper surface of the cone-shaped rotor 4. FIGS. 4(A) and 4(B) show the examples of the cross-sectional pattern of the above two kinds of volute protrusions.

I claim:

1. Gas expelling device for use in a viscous-material treating apparatus such as a kneader, an extruder said gas expelling device comprising:
   a cone-shaped rotor having a plurality of first volute protrusions on its coned surface; and
   a cone-shaped cover member to cover said cone-shaped rotor, said cone-shaped cover member having a gas exhaust orifice through which the gas liberated within said viscous-material treating appratus is removed.

2. Gas expelling device defined in claim 1, wherein the inner surface of said cone-shaped cover member is also provided with a plurality of second volute protrusions curving inversely to said first volute protrusions provided to said cone-shaped rotor.

3. Gas expelling device defined in claim 1 or 2, wherein the vertical angles of geometrical imaginary cones obtained by averaging the forms of said cone-shape rotor and said cone-shaped cover member are obtuse.

* * * * *